United States Patent
Kang et al.

(10) Patent No.: US 9,197,546 B2
(45) Date of Patent: Nov. 24, 2015

(54) SYSTEM AND METHOD FOR PROVIDING A MESSAGING CLUSTER WITH HYBRID PARTITIONS

(71) Applicant: Oracle International Corporation, Redwood Shores, CA (US)

(72) Inventors: Amy H. Kang, Mountain View, CA (US); Edward J. Bratt, Oakland, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 289 days.

(21) Appl. No.: 13/960,427

(22) Filed: Aug. 6, 2013

(65) Prior Publication Data

US 2015/0046541 A1 Feb. 12, 2015

(51) Int. Cl.
G06F 15/16 (2006.01)
H04L 12/703 (2013.01)
H04L 12/58 (2006.01)
H04L 12/18 (2006.01)

(52) U.S. Cl.
CPC ............ *H04L 45/28* (2013.01); *H04L 12/1886* (2013.01); *H04L 51/00* (2013.01); *H04L 51/30* (2013.01)

(58) Field of Classification Search
CPC . H04L 67/1002; H04L 67/1034; H04L 29/06; H04L 69/40; G06F 11/2028
See application file for complete search history.

(56) References Cited

U.S. PATENT DOCUMENTS 7,296,268 B2 * 11/2007 Darling et al. ................ 718/105
8,341,269 B2 12/2012 Balani et al.
(Continued)

FOREIGN PATENT DOCUMENTS

EP 2422545 2/2012
EP 2510653 10/2012

OTHER PUBLICATIONS

Varia, J., Cloud Architectures, Amazon Web Services, https://my.cloudme.com/seadog5339/CloudComputing/Cloud%20Computing/Architecture%20%26%20Infrastructure/cloudarchitectures-varia.pdf, 14 pages, Jun. 2008.
(Continued)

*Primary Examiner* — Peling Shaw
(74) *Attorney, Agent, or Firm* — Tucker Ellis LLP

(57) ABSTRACT

Described herein is a system and method for providing a messaging cluster with hybrid partitions. In accordance with an embodiment, a computer environment or messaging system includes a cluster of message brokers, which supports a hybrid of one or more fixed type partitions and/or on-demand type partitions. A message producer can be associated with a configuration that indicates a type of partition to be used for connection with that message producer. The cluster of message brokers assign to that connection a partition of the type indicated by the connection. Upon a load-balancing or failover of a message broker having active connections to message producers, those connections having an indication of fixed type partition are assigned to the same partition at a failed-over message broker, while those connections having an indication of on-demand type partition can be assigned to any on-demand partition at the failed-over message broker.

18 Claims, 10 Drawing Sheets

(56) References Cited

U.S. PATENT DOCUMENTS

| | | | |
|---|---|---|---|
| 2006/0224826 A1* | 10/2006 | Arai et al. | 711/114 |
| 2007/0121490 A1* | 5/2007 | Iwakawa et al. | 370/218 |
| 2007/0234293 A1* | 10/2007 | Noller et al. | 717/124 |
| 2009/0248941 A1* | 10/2009 | Morein et al. | 710/308 |
| 2012/0233333 A1 | 9/2012 | Ganesan et al. | |
| 2012/0233668 A1* | 9/2012 | Leafe et al. | 726/4 |
| 2012/0239814 A1 | 9/2012 | Mueller et al. | |
| 2012/0240062 A1 | 9/2012 | Passmore et al. | |
| 2012/0324069 A1 | 12/2012 | Nori et al. | |
| 2013/0031403 A1* | 1/2013 | Mordani et al. | 714/4.11 |
| 2013/0031562 A1* | 1/2013 | Gusak | 718/105 |
| 2013/0060834 A1* | 3/2013 | Paramasivam et al. | 709/202 |
| 2013/0204991 A1* | 8/2013 | Skjolsvold et al. | 709/223 |

OTHER PUBLICATIONS

Message Ordering, Network Deployment (All operating systems), Version 8.5, http://pic.dhe.ibm.com/infocenter/wasinfo/v8r5/index.jsp?topic=%2Fcom.ibm.websphere.nd.multiplatform.doc%2Fae%2Fcjj8000_.html, 3 pages, downloaded Apr. 8, 2013.

\* cited by examiner

SYSTEM AND METHOD FOR PROVIDING A MESSAGING CLUSTER WITH HYBRID PARTITIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to computer environments and messaging, and is particularly related to a system and method for providing a messaging cluster with hybrid partitions.

BACKGROUND

In a high-performance computer environment, for example an enterprise software application environment or a cloud-based environment, messaging typically plays an important role.

Generally described, messaging enables loosely-coupled software components (for example, enterprise software applications or cloud-based components) to communicate with each other. In a messaging system, messages are generated/produced by producers, and are delivered to a destination at a message broker, from where they can be received/consumed by consumers. Typically, the message broker operates as a server, and supports advanced features such as load-balancing and failover. A client application may include one or more producers and/or consumers, which can connect to the message broker to respectively produce and/or consume message data.

Scalability and elasticity are desirable characteristics of any messaging system, particularly those intended to support multiple tenants within a cloud-based environment. To address this, techniques such as clustering and data partitioning can be used. For example, the system can use a cluster of message brokers, together with a number of partitions to store message data produced by producers. Typically these partitions are considered permanent or "fixed partitions". In the event of a broker failure, partitions owned by the failed broker are taken over by another broker. When the failed broker comes back, its previously owned partitions must be moved back in order to serve clients. Moving partitions can incur high cost in a messaging system not only due to data migration but also due to restoring message routing states in both broker and failover clients. This cost is necessary when load balancing applications that have a message ordering requirement for their produced messages, even during failover, because producers for these type of applications need to follow the partitions, or stick to the partitions, that they are producing messages to, in order to preserve message ordering in the event of failover. However, the need to migrate fixed partitions may incur a high computational cost with respect to data persistence and message routing, which negatively affects scalability and elasticity.

In some environments, applications have no requirement on message ordering. Load balancing of these applications among message brokers in a cluster does not have to incur partition migration. New "on-demand partitions" can be created on demand to serve clients, for example when a failed broker comes back or a new broker is added to the cluster. These on-demand partitions can be purged or removed when all messages in them are consumed by consumers.

SUMMARY

Described herein is a system and method for providing a messaging cluster with hybrid partitions. In accordance with an embodiment, a computer environment or messaging system includes a cluster of message brokers, which supports a hybrid of one or more fixed type partitions and/or on-demand type partitions. A message producer can be associated with a configuration that indicates a type of partition to be used for connection with that message producer. The cluster of message brokers uses the configuration to assign to that connection a partition of the indicated type. Upon a load-balancing or failover of a message broker having active connections to message producers, those connections having an indication of fixed type partition are assigned to the same partition at a failed-over message broker, while those connections having an indication of on-demand type partition can be assigned to any on-demand partition at the failed-over message broker.

DETAILED DESCRIPTION

Figure 1:
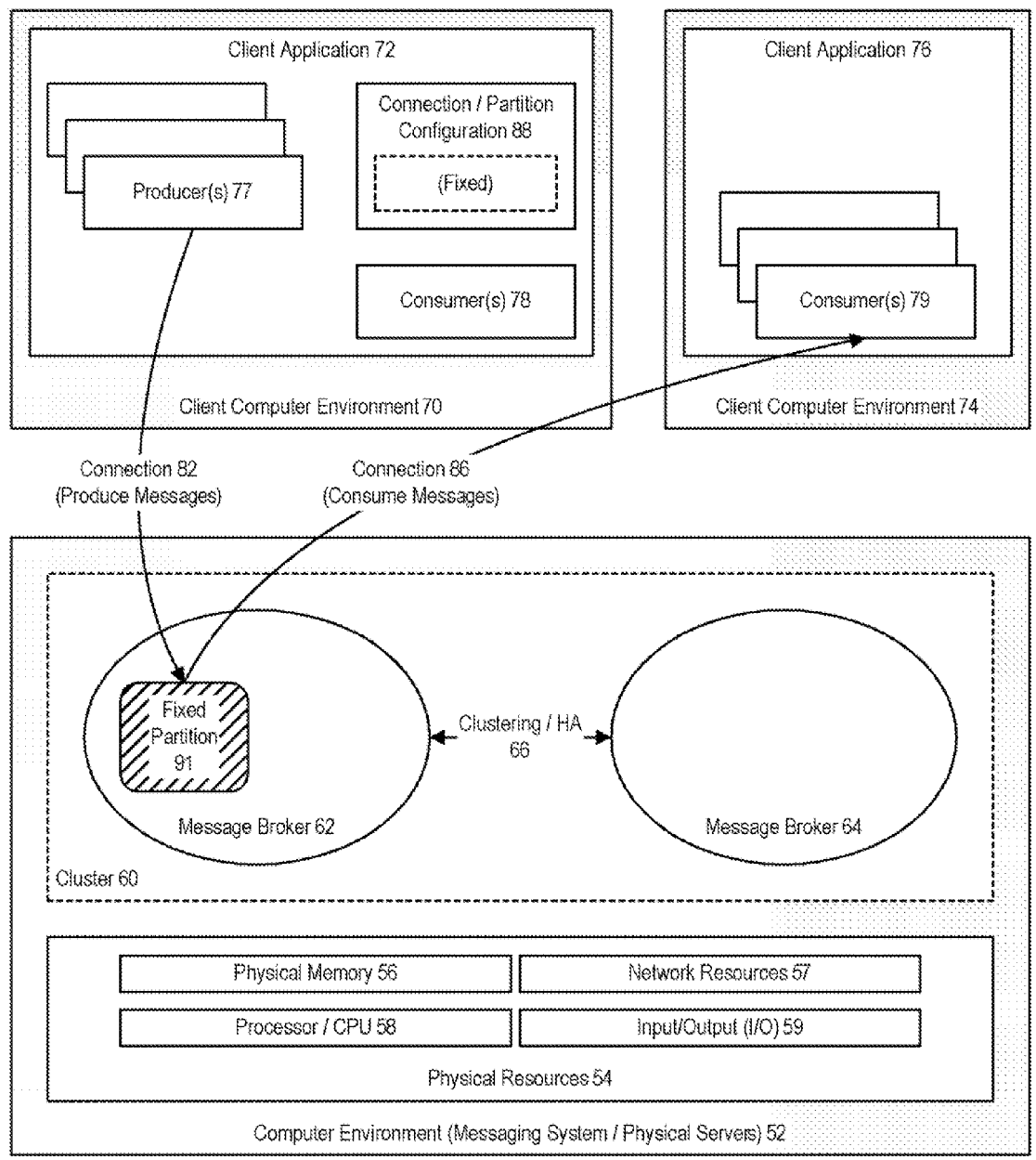
FIG. 1 illustrates a system for providing a messaging cluster with hybrid partitions, in accordance with an embodiment.

As described above, in a high-performance computer environment, for example an enterprise software application environment or a cloud-based environment, messaging typically plays an important role. In a messaging system, messages are generated/produced by producers, and are delivered to a destination at a message broker, from where they can be received/consumed by consumers. Typically, the message broker operates as a server, and supports advanced features such as load-balancing and failover. A client application may include one or more producers and/or consumers, which can connect to the message broker to respectively produce and/or consume message data.

To address scalability and elasticity, techniques such as clustering and data partitioning can be used. For example, the system can use a cluster of message brokers, together with a number of fixed partitions to store message data produced by producers. However, the need to migrate fixed partitions for load balancing can incur high cost with respect to data persistence and message routing. While this cost is unavoidable for load balancing of applications that requires preserving message ordering for the messages they have produced even during failover; for applications that have no message ordering requirement, this cost can be avoid by using an on-demand partition.

Described herein is a system and method for providing a messaging cluster with hybrid partitions. In accordance with an embodiment, a computer environment or messaging system includes a cluster of message brokers, which supports a hybrid of one or more fixed type partitions and/or on-demand type partitions. A message producer can be associated with a configuration that indicates a type of partition to be used for connection with that message producer. The cluster of message brokers uses the configuration to assign to that connection a partition of the indicated type. Upon a load-balancing or failover of a message broker having active connections to message producers, those connections having an indication of fixed type partition are assigned to the same partition at a failed-over message broker, while those connections having an indication of on-demand type partition can be assigned to any on-demand partition at the failed-over message broker.

In accordance with an embodiment, a client connection/partition configuration can be used as the configuration to indicate the type of partition to be associated with particular connection(s) between that client's producers and the message brokers. The messaging system can then use this indication to assign the indicated type of partition to the particular connection.

In accordance with an embodiment, in the event of a load-balancing or failover, a connection with an indication of "fixed" type partition can be assigned to the same partition in a failed-over message broker, which preserves that connection/producer's message order; while a connection with an indication of "on-demand" type partition can be assigned to any partition, including another on-demand partition, within the failed-over message broker (which may not preserve that connection/producer's message order). On-demand partitions can then be cleaned-up and removed as required, for example when all of their messages have been consumed.

By providing a hybrid partition in this manner, including the ability for a client/producer to indicate that either a fixed partition or an on-demand partition be used for that client/producer's connection to the message broker, the system provides flexible support for different types of clients having different message ordering requirements.

FIG. 1 illustrates a system for providing a messaging cluster with hybrid partitions, in accordance with an embodiment.

As shown in FIG. 1, in accordance with an embodiment, a computer environment or messaging system 52, for example an enterprise software application environment or a cloud-based computing environment, can include one or more physical servers having physical computing resources 54, such as physical memory 56, network 57, processor/CPU 58, and input/output (I/O) resources 59. The computing environment can also include a cluster 60 of message brokers 62, 64.

In accordance with various embodiments, the cluster and the message brokers can be provided within a single physical server machine; or alternatively can be distributed across multiple physical server machines. In accordance with various embodiments, the system can also include a persistent storage, and/or can utilize additional technologies such as a data grid to provide communication of data between message brokers, for use in providing clustering, high availability (HA), load-balancing, or failover 66 of message brokers and their data.

As further shown in FIG. 1, in accordance with an embodiment, client computer environments 70, 74, each having a client or client application 72, 76, can include one or more producers 77 and/or consumers 78, 79, which connect to the message broker as appropriate to respectively produce 82 and/or consume 86 message data.

In accordance with an embodiment, each message broker can support the use of one or more fixed partitions, and/or one or more on-demand partitions, to provide a hybrid partition for use by the producers and consumers. The message broker is responsible for maintaining message destinations, queuing messages that are produced by producer clients, and routing those messages to consumer clients. Each producer client produces messages to a particular destination by connecting to a message broker. Each consumer client similarly consumes messages from a particular destination by connecting to a message broker. A message is removed from its destination when the message is consumed or no longer needed.

In accordance with an embodiment, the cluster comprises a set of inter-connected message brokers, to which message brokers can be added to or removed dynamically, for example in response to changes in the number of clients, or for server side load-balancing or administration purposes.

As further shown in FIG. 1, in accordance with an embodiment, a client connection/partition configuration 88 can be used to indicate the type of partition to be associated with a particular connection. For example, in accordance with an embodiment, a connection can be indicated as requiring either a "fixed" type partition, or an "on-demand" type partition. The system uses this information to assign to that connection a partition of the indicated type.

For example, as shown in FIG. 1, when a connection is indicated as being of "fixed" type partition, the message broker handling the connection assigns the connection to a fixed partition 91.

In accordance with an embodiment, the ability to adjust the connection/partition configuration for particular clients/producers can be useful in managing load distribution at the server side or within the cluster. For example, the system can include a default setting for producer connections, and then allow the server to make subsequent decisions as to connection/partition configuration based on its own load-balancing requirements.

Figure 2:
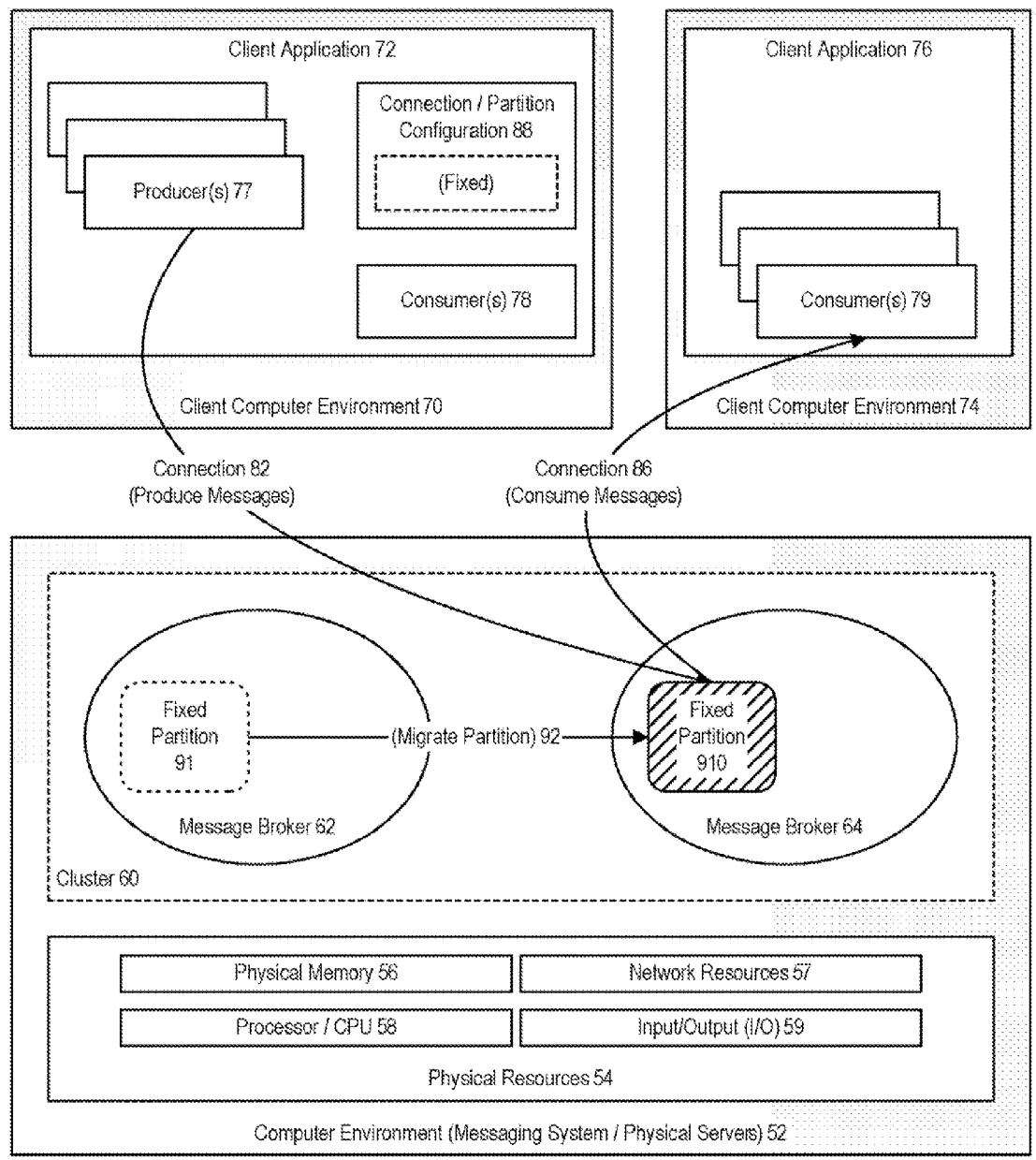
FIG. 2 further illustrates a system for providing a messaging cluster with hybrid partitions, in accordance with an embodiment.

FIG. 2 further illustrates a system for providing a messaging cluster with hybrid partitions, in accordance with an embodiment. In accordance with an embodiment, for some clients/producers the message ordering is important, and message order must be preserved in the event of failover. Examples of such clients include healthcare applications, which often require that their message operations be performed in a particular sequence or order.

For other clients/producers the message ordering may not be important, and message order need not be preserved in the event of failover. Examples of these clients include Java EE applications that produce messages for concurrent processing in a message driven bean, or applications that use a Workflow Management System to control processing sequence.

As shown in FIG. 2, in accordance with an embodiment, in the event of a load-balancing or failover, fixed partitions are migrated 92 to another (failed-over) message broker within the cluster. In accordance with an embodiment, a connection with an indication of "fixed" type partition is assigned to the same partition in the failed-over message broker (here indicated as 910). Since this is the same partition that has the same ordering of existing message data, assigning the connection to the same partition preserves the message ordering for any new messages produced from the connection relative to the existing messages in the partition.

However, migrating partitions between message brokers, as illustrated in FIG. 2, typically involves data migration, data loading, and restoration of message routing states in the brokers and affected clients. As such, partition migration may incur a high cost with respect to data persistence and message routing, which negatively affects system scalability and elasticity.

Different types of clients, particularly in cloud-based environments, may have different requirements as regards message ordering, or have different means to control whatever order is required by their business logic. In accordance with embodiment, the use of fixed partitions can be reserved for use with those clients/producers for which the retention of message ordering is important.

Figure 3:
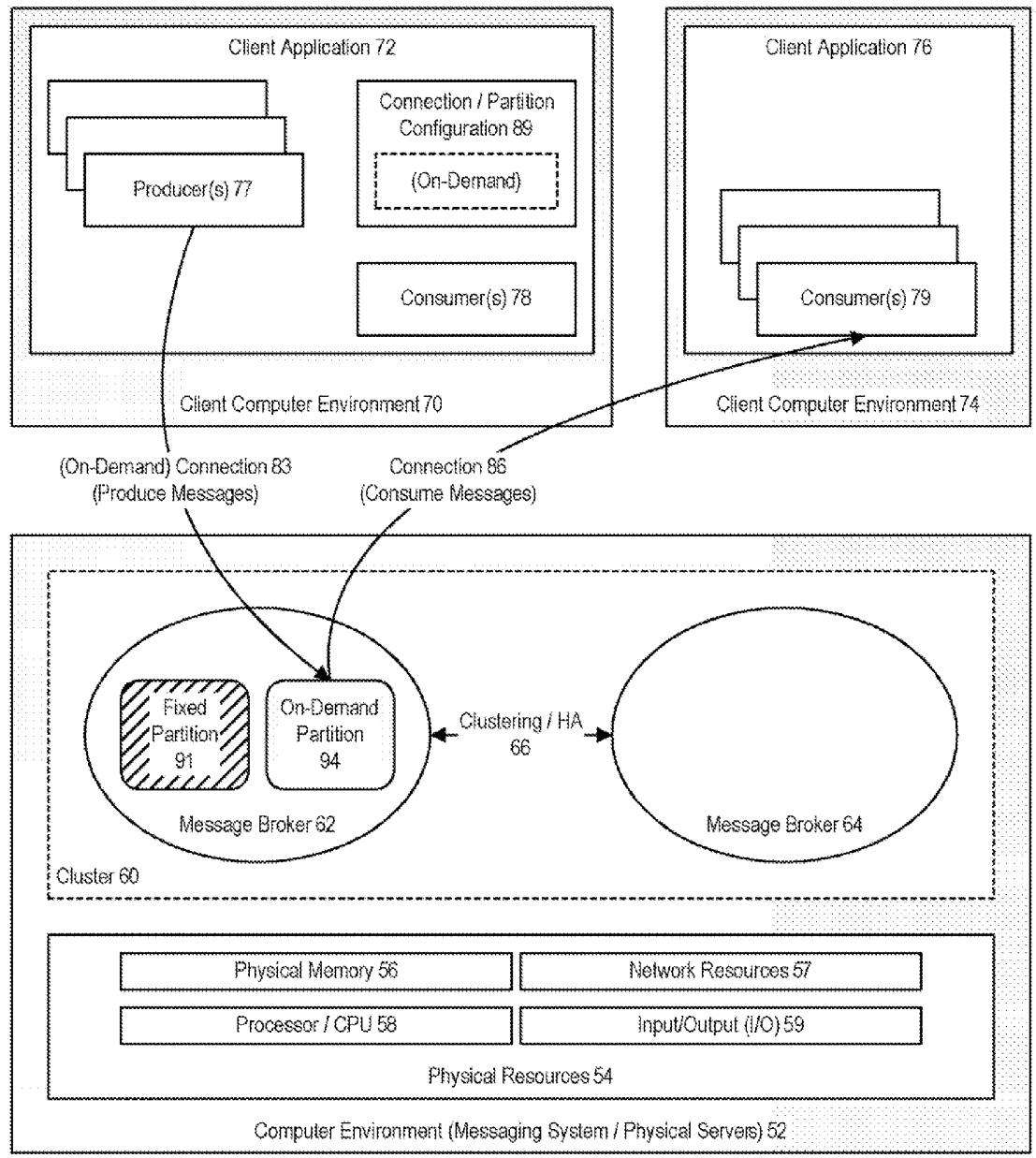
FIG. 3 further illustrates a system for providing a messaging cluster with hybrid partitions, in accordance with an embodiment.

FIG. 3 further illustrates a system for providing a messaging cluster with hybrid partitions, in accordance with an embodiment. As shown in FIG. 3, in accordance with an embodiment, a connection 83 can be indicated in the client configuration 89 as requiring an on-demand type partition; in which case the message broker handling the connection assigns the connection to an on-demand partition 94.

Figure 4:
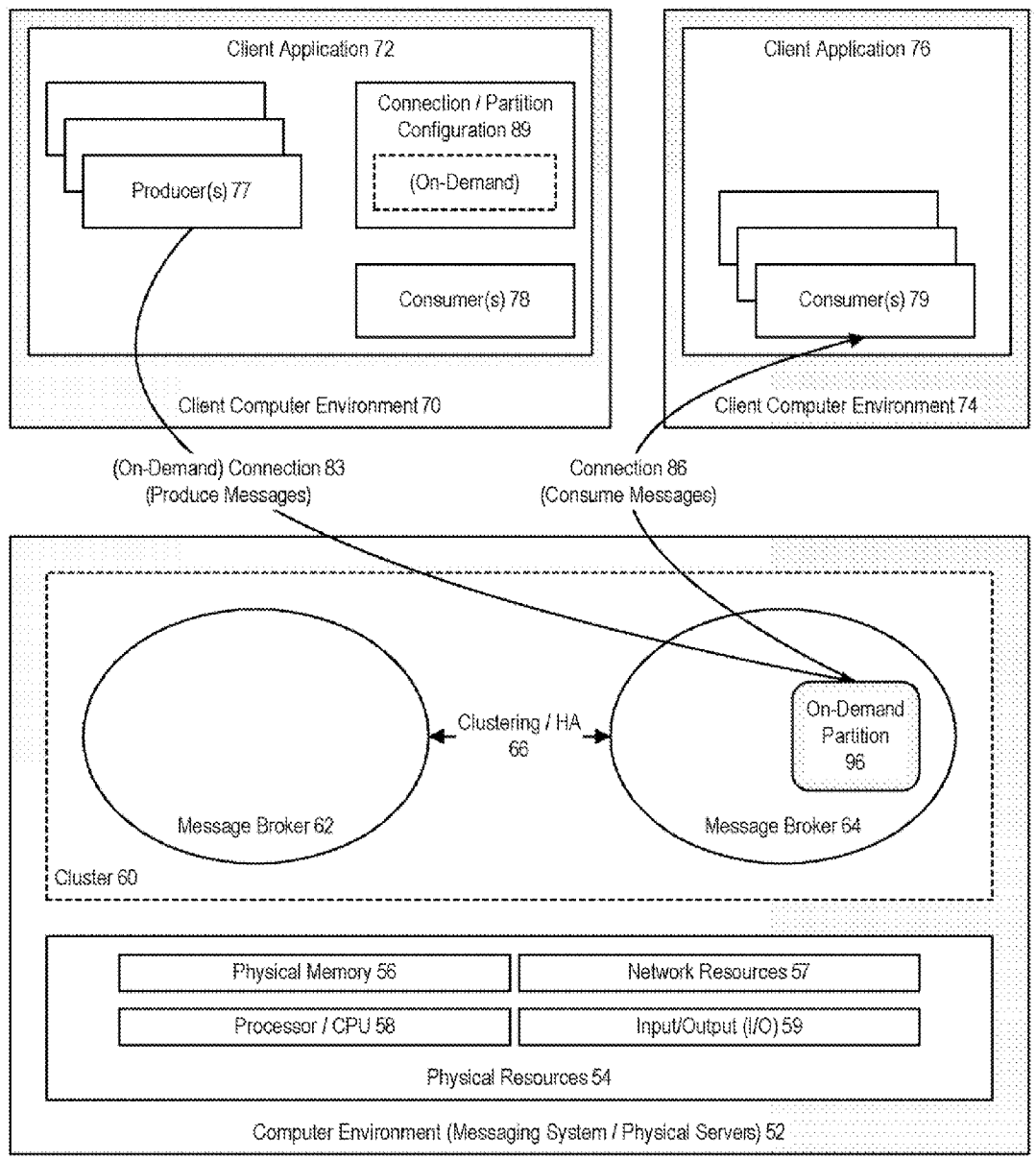
FIG. 4 further illustrates a system for providing a messaging cluster with hybrid partitions, in accordance with an embodiment.

FIG. 4 further illustrates a system for providing a messaging cluster with hybrid partitions, in accordance with an embodiment. As shown in FIG. 4, in accordance with an embodiment, in the event of load-balancing a client among message brokers, its on-demand partitions are not migrated to another message broker within the cluster; instead those connections associated with the on-demand type partition are connected to another partition, such as another on-demand partition 96 at another message broker within the cluster.

In accordance with an embodiment, unless a client indicates by means of its configuration or otherwise, that a fixed partition is required for a particular producer, the system will by default connect that producer to an on-demand partition. In the event of a load-balancing or failover, that client/producer's connection can then be failed over to any partition, including another fixed or on-demand partition within the failed-over message broker.

Depending on the particular embodiment, the on-demand partition can be an existing fixed or on-demand partition at the failed-over message broker, or a newly created partition. For these connections, the message order may not be preserved for messages produced by these connections, since these connections have asked for an on-demand partition.

As described above, scalability and elasticity are desirable characteristics of any messaging system, particularly those intended to support multiple tenants within a cloud-based environment. If only fixed partitions were used, to avoid unnecessary load balancing in under capacity situations, there may be a possibility of many partitions becoming concentrated at relatively few message brokers. In accordance with an embodiment, by allowing the use of on-demand partitions for clients, the partitions can be easily shrunk or grown, without having to move an entire fixed partition from one message broker to another if not necessary. This provides better performance at the server, including better scalability and elasticity.

Figure 5:
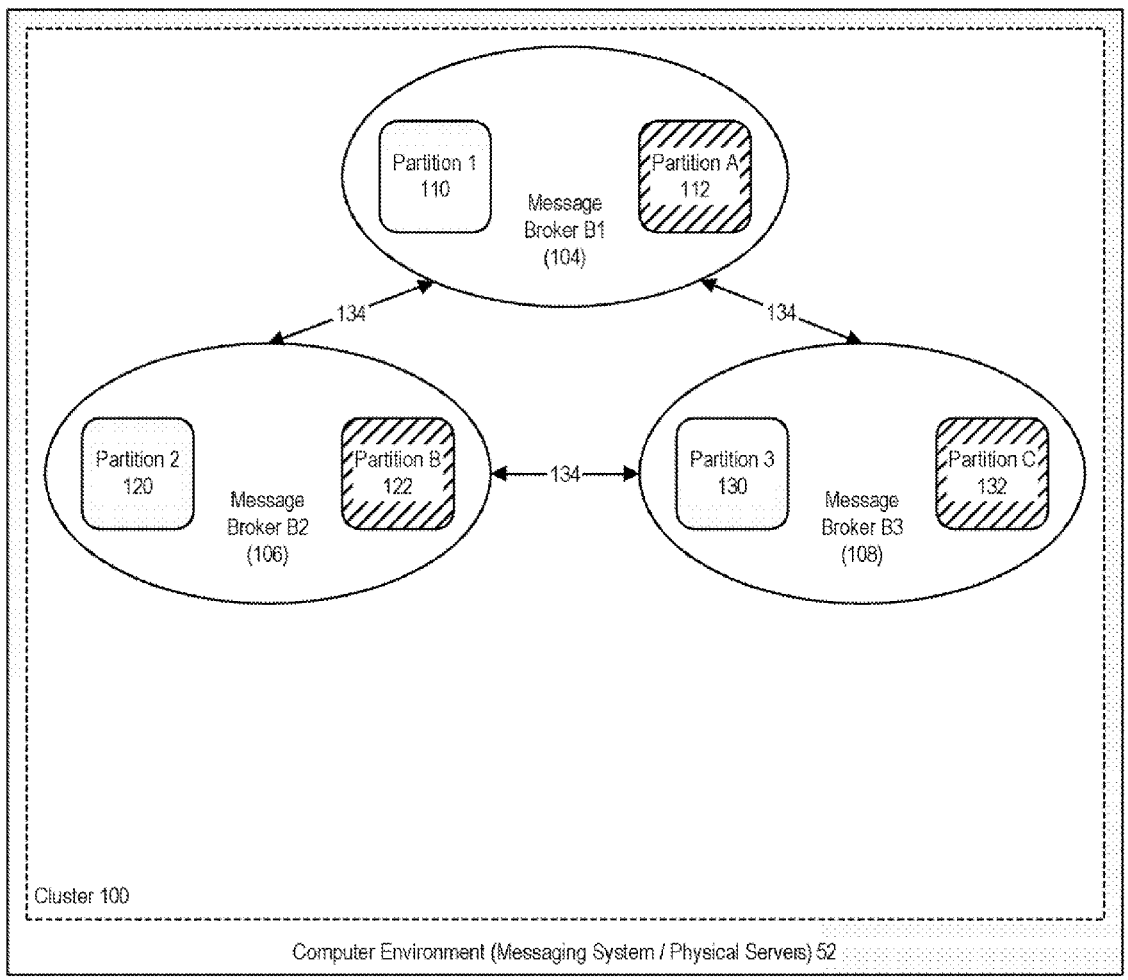
FIG. 5 illustrates an exemplary use of a messaging cluster with hybrid partitions, in accordance with an embodiment.

FIG. 5 illustrates an exemplary use of a messaging cluster with hybrid partitions, in accordance with an embodiment. As shown in FIG. 5, in the example illustrated therein, a cluster 100 of message brokers with hybrid partitions is shown, including Message Broker B1 (104), Message Broker B2 (106), and Message Broker B3 (108).

In the example illustrated in FIG. 5, each of the message brokers have an on-demand type partition (shown as Partition 1 (110), Partition 2 (120), and Partition 3 (130)), and a fixed type partition (shown as Partition A (112), Partition B (122), and Partition C (132)), which together form hybrid partitions at the message brokers for use by clients. The message brokers can communicate 134 using, for example a persistent storage, or a technology such as a data grid to provide communication of data between the message brokers, for use in providing high availability (HA), load-balancing, or failover.

Figure 6:
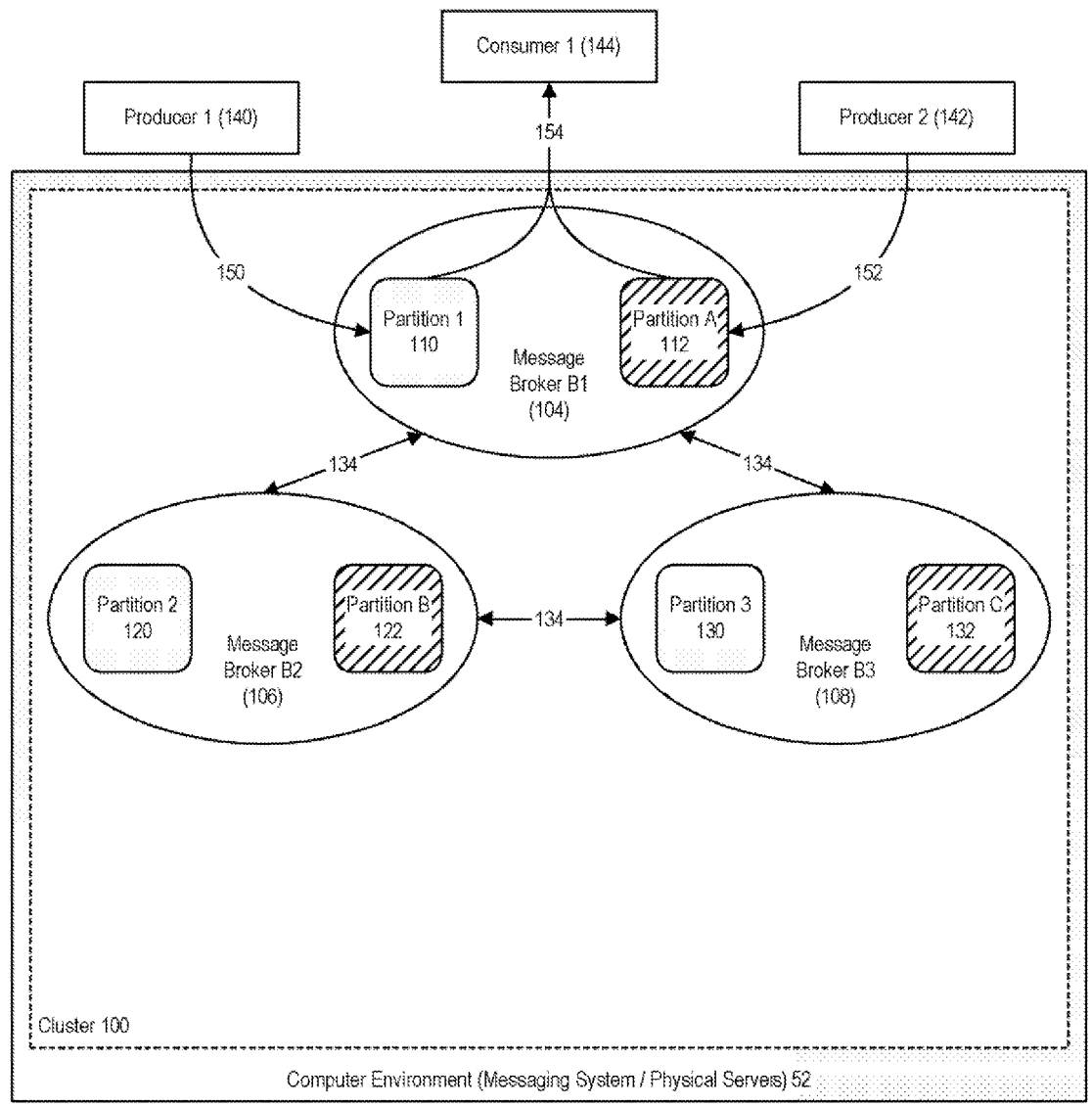
FIG. 6 further illustrates the use of hybrid partitions, in accordance with an embodiment.

FIG. 6 further illustrates the use of hybrid partitions, in accordance with an embodiment. As shown in FIG. 6, in this example, Producer 1 (140) produces messages 150 to Message Broker B1 using its on-demand type Partition 1; while Producer 2 (142) produces messages 152 to Message Broker B1 using its fixed type Partition A. Consumer 1 (144) can consume messages 154 from each of the partitions of the message brokers in the cluster.

Figure 7:
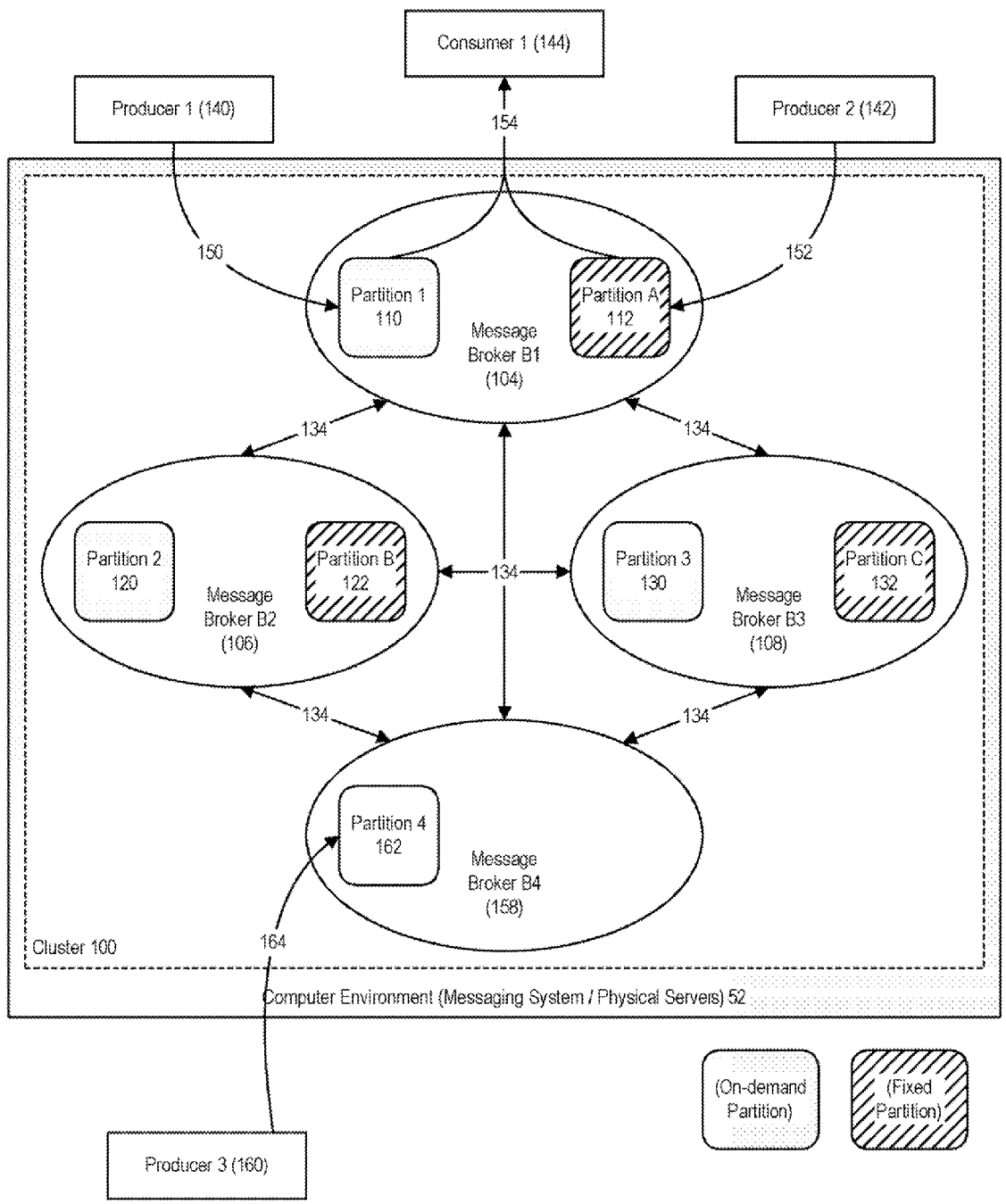
FIG. 7 further illustrates the use of hybrid partitions, in accordance with an embodiment.

FIG. 7 further illustrates the use of hybrid partitions, in accordance with an embodiment. As shown in FIG. 7, in this example, a new Message Broker B4 (158) is added to the cluster to serve a new Producer 3 (160). In this example, Producer 3 has requested (for example, by means of its connection/partition configuration) that the system use an on-demand type partition for its connection, and is accordingly assigned to on-demand type Partition 4 (162). Producer 3 can then begin producing messages 164 to that partition.

Figure 8:
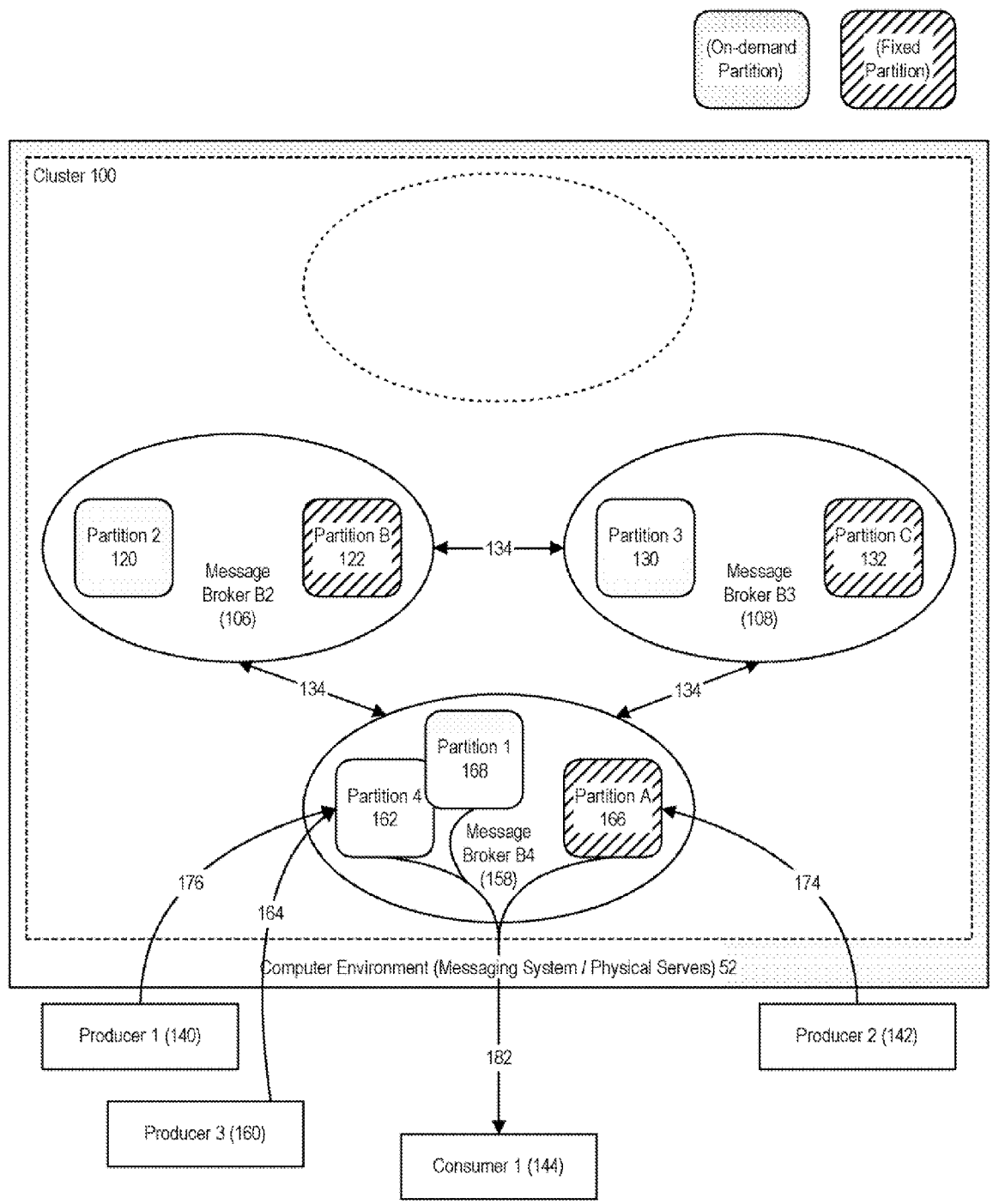
FIG. 8 further illustrates the use of hybrid partitions, in accordance with an embodiment.

FIG. 8 further illustrates the use of hybrid partitions, in accordance with an embodiment. As shown in FIG. 8, in this example, Message Broker B1 has been removed from the cluster, for example as a result of load-balancing or failover.

In the example illustrated in FIG. 8, Message Broker B4 takes over the partitions from Message Broker B1 (for example, by accessing partition information stored at a high availability database or data grid), which causes Producer 2 to fail over its connection 174 to Message Broker B4 on the same fixed type Partition A; and Producer 1 to fail over its connection 176 to Message Broker B4 on the on-demand type Partition 4. If there are messages still contained within Partition 1, those messages continue to be consumed by Consumer 1, since Consumer 1 continues to consume messages 182 from all partitions.

Figure 9:
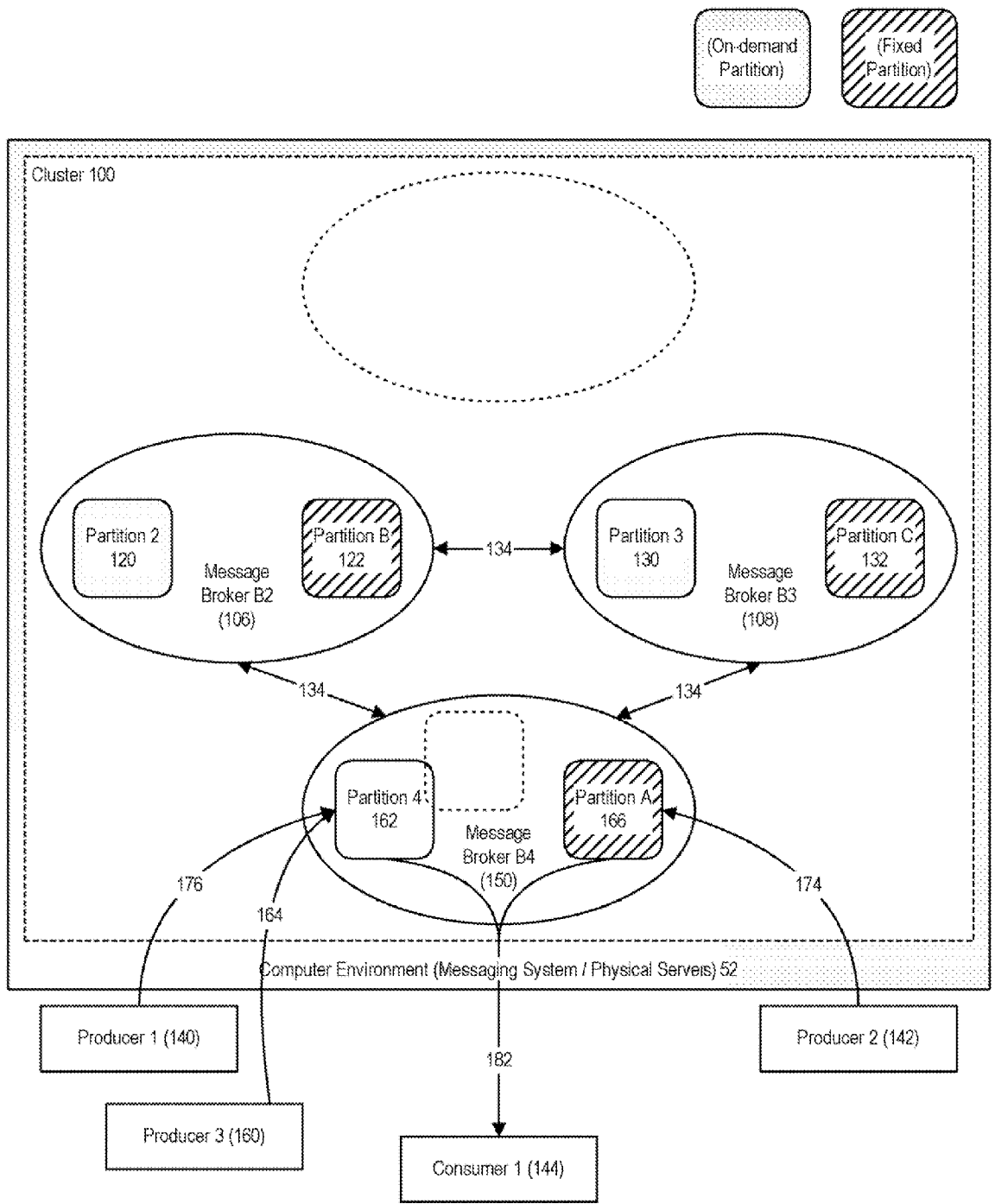
FIG. 9 further illustrates the use of hybrid partitions, in accordance with an embodiment.

FIG. 9 further illustrates the use of hybrid partitions, in accordance with an embodiment. As shown in FIG. 9, in this example, the on-demand type Partition 1 can be cleaned-up and removed when all of its messages have been consumed and the partition no longer contains data.

In accordance with an embodiment, the system can be configured so that no new messages are sent to a failed-over on-demand type partition, so that the partition can be ultimately removed, or cleaned up; in other situations it may be preferable to configure the system to allow continued production of messages to a failed-over partition.

Figure 10:
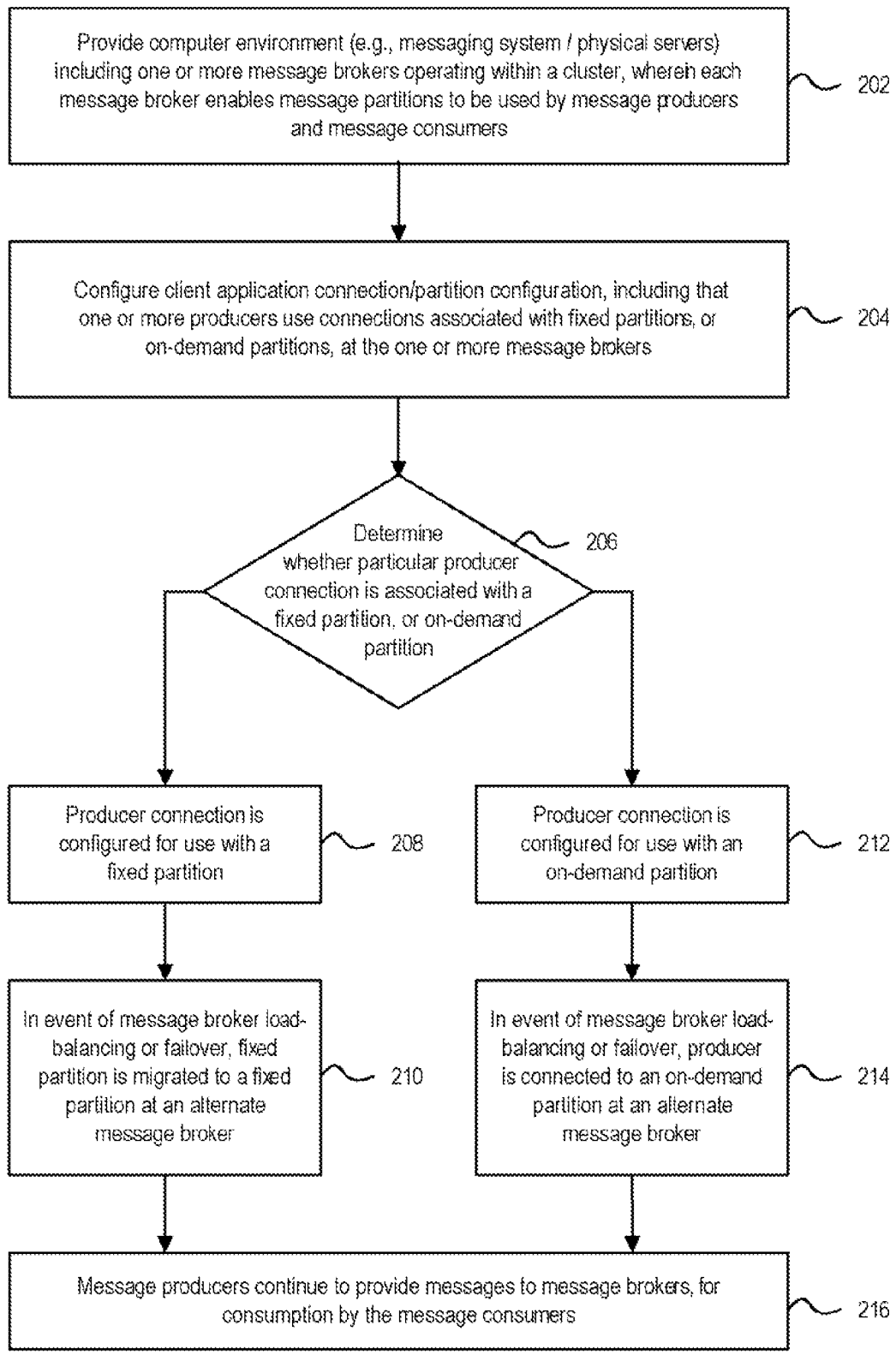
FIG. 10 is a flowchart of a method for providing a messaging cluster with hybrid partitions, in accordance with an embodiment.

FIG. 10 is a flowchart of a method for providing a messaging cluster with hybrid partitions, in accordance with an embodiment. As shown in FIG. 10, in accordance with an embodiment, at step 202, a computer environment or messaging system is provided, including one or more message brokers operating within a cluster, wherein each message broker enables message partitions to be used by message producers and message consumers.

At step 204, a client application is configured with a connection/partition configuration, including that one or more producers use connections associated either with fixed partitions, or with on-demand partitions, at the one or more message brokers.

At step 206, a determination is made as to whether a particular producer connection is associated with a fixed partition, or an on-demand partition.

At step 208, if a determination is made that a producer connection is associated with a fixed partition, then at step 210, in the event of a message broker load-balancing or failover, the fixed partition together with its connections is migrated to (the same) fixed partition at an alternate message broker in the cluster.

At step 212, if a determination is made that a producer connection is associated with an on-demand partition, then at step 214, in the event of a message broker load-balancing or failover, the producer is connected to any on-demand partition at an alternate message broker in the cluster. In accordance with an embodiment, the on-demand partition can be subsequently cleaned-up and removed when no existing connections use it, and there is no more message data in it.

At step 216, the message producers continue to produce messages to the message brokers, for consumption by the message consumers.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a messaging cluster with hybrid partitions, comprising:
    a computer environment which includes a processor and memory;
    a cluster of message brokers operating at the computer environment, which supports a hybrid of one or more fixed type partitions and on-demand type partitions;
    wherein a message producer can be associated with a configuration that indicates a type of partition to be used for connection with that message producer, and wherein the cluster of message brokers assigns to that connection a partition of the indicated type; and
    whereupon a load-balancing or failover of a message broker having active connections to message producers,
        those connections having an indication of fixed type partition are assigned to a same partition at a failed-over message broker, and
        those connections having an indication of on-demand type partition are assigned to an on-demand partition at the failed-over message broker.

2. The system of claim 1, wherein the system includes one or more clients having one or more producers or consumers which connect to the cluster of message brokers to respectively produce or consume message data.

3. The system of claim 1, wherein the cluster of message brokers includes a plurality of message brokers, and wherein each of the plurality of message brokers includes one or more fixed type partitions and one or more on-demand type partitions.

4. The system of claim 1, whereupon those connections having the indication of fixed type partition being assigned to the same partition at the failed-over message broker, the ordering of messages associated with those connections is preserved.

5. The system of claim 1, whereupon those connections having the indication of on-demand type partition being assigned to any on-demand partition at the failed-over message broker, any existing messages produced by those connections continue to be consumed by consumers, and the on-demand partition is cleaned-up and removed when there is no more message data in it.

6. The system of claim 1, wherein the system is used in a cloud-based environment.

7. A method for providing a messaging cluster with hybrid partitions, comprising:
    providing, at a computer environment, a cluster of message brokers which supports a hybrid of one or more fixed type partitions and on-demand type partitions;
    associating a message producer with a configuration that indicates a type of partition to be used for connection with that message producer;
    assigning to that connection a partition of the indicated type; and
    upon a load-balancing or failover of a message broker having active connections to message producers,
        assigning those connections having an indication of fixed type partition to a same partition at a failed-over message broker, and
        assigning those connections having an indication of on-demand type partition to an on-demand partition at the failed-over message broker.

8. The method of claim 7, further comprising providing one or more clients having one or more producers or consumers which connect to the cluster of message brokers to respectively produce or consume message data.

9. The method of claim 7, wherein the cluster of message brokers includes a plurality of message brokers, and wherein each of the plurality of message brokers includes one or more fixed type partitions and one or more on-demand type partitions.

10. The method of claim 7, whereupon those connections having the indication of fixed type partition being assigned to the same partition at the failed-over message broker, the ordering of messages associated with those connections is preserved.

11. The method of claim 7, whereupon those connections having the indication of on-demand type partition being assigned to any on-demand partition at the failed-over message broker, any existing messages produced by those connections continue to be consumed by consumers, and the on-demand partition is cleaned-up and removed when there is no more message data in it.

12. The method of claim 7, wherein the system is used in a cloud-based environment.

13. A non-transitory computer readable storage medium, including instructions stored thereon, which when read and executed by a computer, causes the computer to perform the steps comprising:
providing, at a computer environment, a cluster of message brokers which supports a hybrid of one or more fixed type partitions and on-demand type partitions;
associating a message producer with a configuration that indicates a type of partition to be used for connection with that message producer;
assigning to that connection a partition of the indicated type; and
upon a load-balancing or failover of a message broker having active connections to message producers,
assigning those connections having an indication of fixed type partition to a same partition at a failed-over message broker, and
assigning those connections having an indication of on-demand type partition to an on-demand partition at the failed-over message broker.

14. The non-transitory computer readable storage medium of claim 13, further comprising providing one or more clients having one or more producers or consumers which connect to the cluster of message brokers to respectively produce or consume message data.

15. The non-transitory computer readable storage medium of claim 13, wherein the cluster of message brokers includes a plurality of message brokers, and wherein each of the plurality of message brokers includes one or more fixed type partitions and one or more on-demand type partitions.

16. The non-transitory computer readable storage medium of claim 13, whereupon those connections having the indication of fixed type partition being assigned to the same partition at the failed-over message broker, the ordering of messages associated with those connections is preserved.

17. The non-transitory computer readable storage medium of claim 13, whereupon those connections having the indication of on-demand type partition being assigned to the on-demand partition at the failed-over message broker, any existing messages produced by those connections continue to be consumed by consumers, and the on-demand partition is cleaned-up and removed when there is no more message data in it.

18. The non-transitory computer readable storage medium of claim 13, wherein the system is used in a cloud-based environment.

* * * * *